Aug. 19, 1924.
R. G. BRINDLE
1,505,696
MANUFACTURE OF DEXTRINE
Filed Jan. 26, 1920
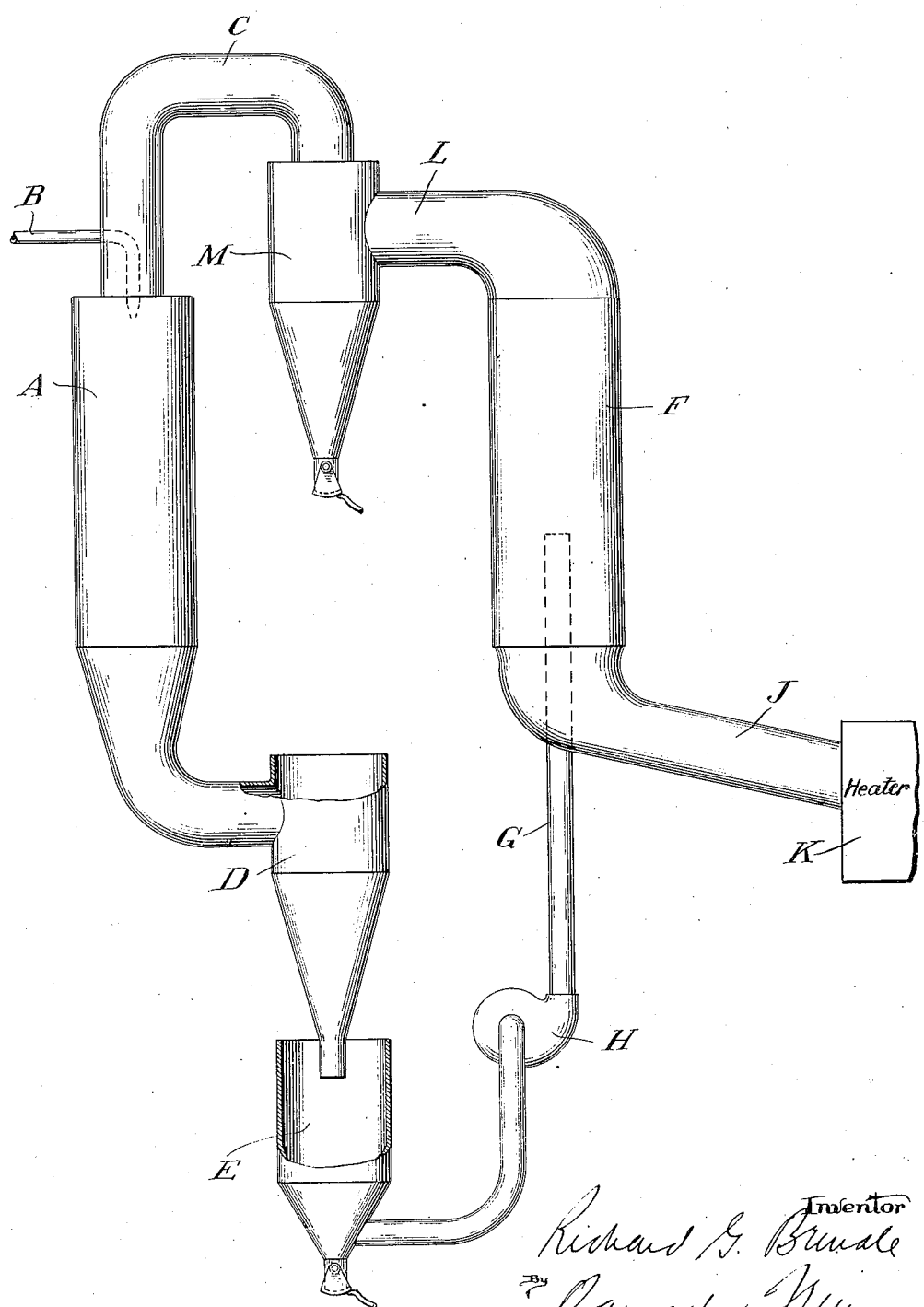
Inventor
Richard G. Brindle
By Barnett & Newman
Attorneys Patented Aug. 19, 1924.

1,505,696

UNITED STATES PATENT OFFICE.

RICHARD G. BRINDLE, OF CHICAGO, ILLINOIS, ASSIGNOR TO CORN PRODUCTS REFINING COMPANY, A CORPORATION OF NEW JERSEY.

MANUFACTURE OF DEXTRINE.

Application filed January 26, 1920. Serial No. 353,958.

*To all whom it may concern:*

Be it known that I, RICHARD G. BRINDLE, a citizen of the United States, residing at Chicago, in the county of Cook and State of Illinois, have invented certain new and useful Improvements in the Manufacture of Dextrine, of which the following is a specification.

My invention relates to the manufacture of dextrines and allied products, and the primary object of the invention is to provide an improved method of making these products having certain advantages to be hereinafter described, and an apparatus suitable for carrying out this method. According to the process of making dextrines (this term being used herein to include British gum and other similar products resulting from the modification by hydrolysis of starch) the starch, after being acidified with hydrochloric, nitric or other acid—which for some products may be unnecessary if the starch already contains acid remaining from the steeping of the corn—is subjected to a roasting operation which brings about the modification or conversion of the starch. This method of procedure has several disadvantages. It is difficult to uniformly mix the acid which is used in comparatively small quantities with large volumes of starch. It is also difficult to distribute the heat uniformly throughout the batch. Consequently the product is likely to lack uniformity. Some of the starch goes over into sugar while some may remain starch. The dextrinization of the rest may vary to a considerable extent. If certain starch particles are overacidified or subjected to too high a temperature or subjected to heat for too long a time, they may be carbonized and appear in the dextrine as black specks. Lumps are also likely to be found which are overtreated on the outside and not dextrinized at all within, necessitating the screening of the product. My invention seeks to overcome these difficulties by a treatment of the material which besides giving a uniform product, much lower in sugar, for example, than the ordinary dextrines, and more uniformly dextrinized throughout to the extent required for the particular product desired, is more economical of heat than the old methods, and simplifies considerably the handling of the material during manufacture.

In the drawing I have shown, somewhat diagrammatically, an apparatus suitable for practicing the process.

Referring to the drawing, A is a starch drying chamber or duct into which starch, mixed with water and acidified to the extent required, is introduced in the form of a spray by means of spray nozzle B which may be of any desired type. Heated air or other gas is introduced into the top of the chamber through a pipe C. D is a separator of the cyclone type, for example, from the top of which air and vapors are discharged, the starch being delivered to a suitable vessel E. The process contemplates subjecting the sprayed starch to a relatively high temperature and causing the starch liquor to be introduced into the drying chamber A in relatively large volumes. The result is that the drop in temperature in the chamber A is very substantial. To operate the apparatus economically the air discharged from separator D should be as cool as possible. It is not intended that there should be any appreciable dextrinization of the starch in chamber A because the application of heat to the moist starch sufficient to dextrinize it would unavoidably carry a considerable portion of the product over into sugar. However, a certain modification of the starch may take place which facilitates its subsequent dextrinization. A certain amount of the acid in the starch will be evaporated and pass out with the air from separator D but the temperature used need not be high enough to produce the evaporation of any very large part of the acid. The starch from the vessel E—or the vessel E might be omitted and the starch taken directly from the separator—is then dextrinized in any suitable manner. Preferably it is injected into the dextrinizing chamber F through a pipe G in which is arranged a fan H. The dextrinizing chamber is connected by a duct J with any suitable form of heater, indicated at K, by means of which heated air, or other gas, is forced into the dextrinizing vessel. The starch particles forced through the pipe G are suspended on this current of heated air and the dextrinization takes place during the upward movement of the starch through the chamber. A duct L leads from the upper end of the chamber to a separator M. The heated air passes from the separator through pipe C, above referred to, to the drying vessel A.

The arrangement, it will be seen, economizes heat which is a matter of considerable importance when the products are manufactured in large quantities. The following may be taken as an example of the temperatures used, although it will be understood that these temperatures may be varied considerably, and will necessarily vary, in accordance with the character of the product desired. Temperature, degree of acidulation and length of time that the starch is subjected to treatment are all factors determinative of the color, solubility and other characteristics of the product obtained, well known in this art. As a matter of illustration, the air introduced into the dextrinizing chamber may have a temperature of 450° Fahrenheit. This temperature will be reduced at the place that the air current enters the drying chamber A to, say, 400° Fahrenheit. The evaporation of the water contained in the starch may further reduce this temperature so that the air issuing from the separator D will have a temperature of only 160°. Thus the loss of heat units is comparatively small, being represented by the difference between 160° and the outside temperature.

I understand that it has been proposed to convert starch into dextrine and allied products by spraying the acidified starch into a chamber containing a heated gas in circulation and producing a simultaneous evaporation of the water and dextrinization of the solids; but the practicability of this method seems doubtful, in view, particularly, of the difficulty of circulating the material through the apparatus without overtreating some of it and the likelihood of a considerable portion of the starch going over to sugar if the starch while still in moist condition is subjected to a sufficiently high temperature to produce dextrinization. It is well known that the conversion, under these circumstances, of dextrine into sugar is very rapid. Moreover, if dextrinization does not take place simultaneously with the evaporation of the water it is not likely to take place subsequently because the temperature, much reduced by evaporation of water, can hardly be sufficient to dextrinize the starch, or at least to produce any of the high soluble dextrines. However, my invention proceeds upon a different theory of operation. The highest temperature is not applied to the starch until after it has been dried. Therefore the danger of converting the starch to sugar is obviated. The drying and dextrinization are not carried on simultaneously but successively, the drying at a relatively low temperature, involving at most but a slight modification of the starch, the dextrinization at a comparatively elevated temperature as is necessary if a soluble high dextrine is to be obtained. By describing the starch entering the dextrinizing chamber as "dry" I do not mean that it may not contain a certain amount of moisture, enough to carry the quantity of acid needed for dextrinization, for instance. Commercial starch is commonly spoken of as dry but will contain ordinarily ten per cent or more of water.

I claim:

1. Method of manufacturing dextrine and allied products which consists in suspending starch particles acidified but in a substantially dry state in a current of air, and subjecting the starch while so suspended to a blast of heated air.

2. Method of manufacturing dextrine and allied products which consists in spraying an acidified starch liquor in a drying atmosphere, separating the substantially dried acidified starch from the bulk of the drying gas and vapor and then subjecting the acidified starch to heat sufficient to produce dextrinization.

3. Method of manufacturing dextrine and allied products which consists in spraying an acidified starch liquor in a drying atmosphere, separating the substantially dried acidified starch from the bulk of the drying gas and vapor then suspending the separated acidified starch particles in a gas and causing them while thus suspended to pass through a zone of temperature sufficient to produce dextrinization.

4. Method of manufacturing dextrine and allied products which consists in continuously spraying an acidified starch liquor into a drying atmosphere, collecting the substantially dry acidified starch and injecting the same into a current of heated gas to produce dextrinization, separating the resulting dextrine from the gas and utilizing the heated gas for producing the beforementioned drying of the starch liquor.

5. Apparatus for carrying out the process described comprising in combination a drying chamber, means for spraying an acidified starch liquor into the same, means for collecting the dried starch in said chamber a dextrinizing chamber, means for injecting the dried starch into said dextrinizing chamber, and means for introducing heated gas into said dextrinizing chamber against the starch injected therein, a separator to remove the resultant dextrine from the aforesaid heated gas, and means for conducting said gas free from dextrine to the starch drying chamber.

6. In apparatus for carrying out the process described, the combination of a starch drying chamber, a spray nozzle extending into the upper end of the chamber, a separator at the lower end of the chamber, a dextrinizing chamber, a heater, and means for introducing heated gas from the heater into the bottom of the dextrinizing chamber, means for injecting the starch dried in said starch drying chamber into the bottom of the dextrinizing chamber into the heated gas in said dextrinizing chamber, a separator connected to the upper end of the dextrinizing chamber, and a pipe leading from the last named separator to the top of the drying chamber, substantially as described.

7. Method of manufacturing dextrine and allied products which consists of acidifying starch, spraying the acidified starch liquor into a drying atmosphere to evaporate most of the water, leaving the starch in a substantially dry powdery form but containing some acid, then subjecting the starch so acidified and dried, and while dry, to a temperature higher than the temperature at which it was dried.

8. Method of manufacturing dextrine and allied products which consists in continuously spraying an acidified starch liquor into a drying atmosphere, separating the starch in substantially dry form but containing some acid, and showering the same through a dextrinizing atmosphere at a higher temperature than said drying atmosphere.

9. Method of manufacturing dextrine and allied products which consists in acidifying starch while the starch is supended in water, separating the bulk of the liquid from the starch so as to leave the starch in substantially dry condition but acidified, and then subjecting the starch to a dextrinizing temperature above that at which the starch is dried.

10. Method of manufacturing dextrine and allied products which consists in acidifying starch while the starch is suspended in water, subjecting the starch to heat to reduce the same to substantial dryness but without eliminating all of the acid therefrom, and subjecting the starch in this condition to a temperature higher than the temperature at which it was dried.

11. Method of manufacturing dextrine and allied products which consists in acidifying starch while the starch is suspended in water, spraying the starch, water and acid mixture, into a drying atmosphere to reduce the starch to substantial dryness without removing all of the acid therefrom, and then subjecting the starch in this condition while in suspension to a higher temperature than that at which it was dried.

RICHARD G. BRINDLE.